United States Patent [19]

Halvorsen

[11] Patent Number: 4,938,418
[45] Date of Patent: Jul. 3, 1990

[54] MODULAR FUEL NOZZLE ASSEMBLY FOR GAS TURBINE ENGINES

[75] Inventor: Robert M. Halvorsen, Birmingham, Mich.

[73] Assignee: Fuel Systems Textron Inc., Walled Lake, Mich.

[21] Appl. No.: 278,953

[22] Filed: Dec. 1, 1988

[51] Int. Cl.⁵ .................................................. F02C 7/22
[52] U.S. Cl. ........................................ 239/5; 239/390; 239/584
[58] Field of Search ............... 239/5, 390, 391, 397, 239/533.2, 533.7, 533.9, 570, 584, 600; 60/735, 740–742

[56] References Cited

U.S. PATENT DOCUMENTS

| | | | |
|---|---|---|---|
| 2,574,865 | 11/1951 | Edwards | 299/118 |
| 2,893,647 | 7/1959 | Wortman | 239/464 |
| 3,022,954 | 2/1962 | Davies et al. | 239/584 X |
| 3,154,095 | 10/1964 | Cleminshaw et al. | 60/742 X |
| 3,310,240 | 3/1967 | Grundman | 239/404 |
| 3,472,025 | 10/1969 | Simmons et al. | 60/39.74 |
| 3,598,321 | 8/1971 | Bobzin | 239/400 |
| 3,662,959 | 5/1972 | Sample, Jr. | 239/533 |
| 3,684,186 | 8/1972 | Helmrich | 239/400 |
| 3,980,233 | 9/1976 | Simmons et al. | 239/400 |
| 4,491,272 | 1/1985 | Bradley et al. | 239/5 |
| 4,590,768 | 5/1986 | Halvorsen et al. | 60/741 |
| 4,742,685 | 5/1988 | Halvorsen et al. | 60/739 |

OTHER PUBLICATIONS

Product Brochure, Gas Turbine Fuel Nozzles, Ex-Cell-O Corporation, Aerospace Group.

Primary Examiner—Andres Kashnikow
Assistant Examiner—William Grant
Attorney, Agent, or Firm—Edward J. Timmer

[57] ABSTRACT

A modular fuel nozzle assembly includes a precalibrated, stand-alone valve module having a fuel metering valve and a precalibrated, stand-alone nozzle module having a fuel injection nozzle. The valve module and nozzle module include separate support housings joined together at an interface between the two modules to facilitate manufacturing, testing and maintainability of the fuel nozzle assembly. Fuel tubes extend across the interface to interconnect fuel passages in the joined modules.

23 Claims, 6 Drawing Sheets

MODULAR FUEL NOZZLE ASSEMBLY FOR GAS TURBINE ENGINES

FIELD OF THE INVENTION

The present invention relates to fuel nozzle assemblies of the type used for gas turbine engines.

BACKGROUND OF THE INVENTION

Fuel nozzle assemblies for gas turbine engines have included dual orifice, airblast and hybrid types for the purpose of discharging one or more atomized fuel sprays into the combustors of gas turbine engines. In the case of dual orifice and hybrid types of fuel nozzle assemblies, a primary fuel spray and a secondary fuel spray are discharged by the nozzle. The primary fuel spray is typically a low fuel flow rate spray for the purpose of low power engine operation while the secondary fuel spray is a high fuel flow rate spray used in addition to the primary fuel flow spray for the purpose of high power engine operation. The secondary fuel flow typically is valved by a fuel metering valve integrally disposed in the support housing of the fuel nozzle assembly. U.S. Pat. No. 3,662,959 issued May 16, 1972, and U.S. Pat. No. 4,491,272 issued Jan. 1, 1985, illustrate typical dual orifice fuel nozzle assemblies with integral secondary fuel metering valving.

In some airblast fuel nozzle assemblies, a single fuel spray is injected into the combustor. The fuel spray flow rate typically is valved by a fuel metering valve integrally disposed in the support housing of the assembly Such airblast fuel nozzle assemblies are employed on the F100 military aircraft gas turbine engine.

In the past, the various components of the fuel nozzle assembly have been assembled onto a single support housing, typically comprised of a single metal casting or forging, having a chamber adjacent the upstream end to receive a fuel metering valve cartridge and a fuel filter and having a downstream end onto which the fuel nozzle is attached. In particular, the fuel injection nozzle is typically formed of concentric members, some of which are attached, for example, brazed or welded, to the downstream end of the support housing and others of which are pre-brazed/welded together. That is, a functioning nozzle is only formed once all the concentric components are fabricated to one another and to the downstream end of the support housing. A stand-alone, functioning nozzle module having its own support housing without any fuel metering valve chamber has not been employed heretofore.

Similarly, although a metering valve cartridge has been employed, the valve cartridge is assembled into the chamber adjacent the upstream end of the support housing (the same support housing on which the nozzle is attached) and enclosed in the chamber by the end closure cap sealed/welded on the upstream end of the support housing, the end closure cap typically having a fuel inlet thereon. A standalone, functioning valve module having its own support housing with a fuel inlet has not been employed heretofore.

Furthermore, subsequent repair of these fuel nozzle assemblies after service in the gas turbine engine is complex, time-consuming and costly, especially when the nozzle requires repair or replacement for some reason. In particular, the various concentric members forming the nozzle must be disassembled from the downstream end of the support housing and repaired or replaced and require subsequent reattachment (e.g., brazing, welding) to one another and to the support housing to form a functioning nozzle.

Fuel nozzle assemblies incorporating a fuel metering valve are calibrated to exhibit fuel flow versus fuel pressure characteristics within prescribed limits; e.g., within plus or minus a certain percentage (e.g., 3%) of the prescribed nominal fuel flow versus fuel pressure characteristics (or flow curve) prescribed for a particular engine application. For example, the fuel metering valve cartridge is precalibrated using a test adapter to simulate downstream pressure drops (or back pressure) to be encountered when the valve cartridge is assembled inside the support housing. The fuel injection nozzle components are attached, for example, brazed, on the support housing to form a functioning nozzle and then the nozzle is flow tested without the valve cartridge disposed in the support housing. If necessary, a trim orifice in the support housing is adjusted to provide the desired pressure drop across the functioning nozzle. Then, the valve cartridge is inserted in the support housing and sealed therein by welding/sealing the end closure cap onto the support housing to enclose the valve cartridge.

SUMMARY OF THE INVENTION

The present invention contemplates a fuel nozzle assembly of the dual orifice, airblast or hybrid types utilizing a separate precalibrated, stand-alone valve module and a separate precalibrated, stand-alone nozzle module readily joinable at a given interface between the modules to form a functioning fuel nozzle assembly meeting desired total fuel flow versus fuel pressure characteristics without the need for further adjustment of the modules after joining.

The present invention also contemplates such a modular fuel nozzle assembly with separate valve and nozzle modules joined together and characterized by ease of manufacture, testing, maintainability and module replacement, if required The present invention further contemplates such a modular fuel nozzle assembly and method for manufacturing same wherein the valve module and nozzle module can be made independently of one another; for example, on separate assembly lines, as separately precalibrated, stand-alone modules such that any one of a plurality of valve modules can be joined to any one of a plurality of nozzle modules to form a functioning fuel nozzle assembly having desired fuel flow versus fuel pressure characteristics.

Joining of any one of the valve modules with any one of the nozzle modules can be effected by suitable means during manufacture of the fuel nozzle assembly or during subsequent repair and overhaul thereof after service in a gas turbine engine The present invention thus also contemplates such a modular fuel nozzle assembly which can be repaired after service, if required, simply by valve or nozzle module replacement.

In a typical working embodiment of the invention, the fuel nozzle assembly comprises (a) a valve module having a first outer support housing with a fuel inlet, a fuel metering valve mounted interiorly of the first housing for providing a valved fuel flow and a first fuel passage for receiving the valved fuel flow and (b) a nozzle module having a second outer support housing, a second fuel passage for receiving the valved fuel flow from the first fuel passage, and a fuel injection nozzle on the second housing for discharging the valved fuel flow into a combustion chamber. The first support housing and the second support housing are joined together by suitable means at an interface in such a manner as to permit separation of the modules from one another. The first and second fuel passages are in fuel flow communication across the interface. The interface is typically located between the fuel metering valve module and the fuel injection nozzle module to permit separation of the valve module and nozzle module; for example, for replacement or repair of one of the modules. The valve module and nozzle module are precalibrated to provide, when joined during initial assembly or after repair, fuel flow versus fuel pressure characteristics prescribed for the fuel nozzle assembly without the need for adjustment of the valve and nozzle modules after joining In one embodiment of the invention, the interface between the first and second support housings is preferably located between the fuel metering valve and a mounting flange by which the fuel nozzle assembly is mounted to an engine case In another embodiment of the invention, a trimming orifice for the valved fuel flow is temporarily provided in the second support housing adjacent the joint for ready access during manufacture of the nozzle module to facilitate external precalibration of the nozzle module. The trimming orifice may be disposed temporarily in or adjacent to a fuel-receiving chamber formed at the joint between the first and second support housings In still another embodiment of the invention, a fuel tube extends across the joint between the valve module and nozzle module to interconnect fuel passages in the modules in fuel flow relation with one another. The fuel tube may be fastened; for example, brazed, to one of the modules and be releasably, sealingly received in the other of the modules.

The method of the present invention involves forming precalibrated, stand-alone valve modules and nozzle modules and joining a valve module and nozzle module together at an interface between the fuel metering valve and the nozzle to form a fuel nozzle assembly with fuel flow versus fuel pressure characteristics within prescribed limits without the need for adjustment of the modules after joining.

DETAILED DESCRIPTION OF THE INVENTION

FIGS. 1-6 illustrate one embodiment of the fuel nozzle assembly 10 of the invention. In particular, the fuel nozzle assembly 10 includes a precalibrated, stand-alone (integrated) valve module 12 joined to a precalibrated, stand-alone (integrated) nozzle module 14 by suitable means, such as at a weld joint or interface J, to form the assembly 10 having desired total fuel flow versus fuel pressure characteristics without the need to adjust either module 12 or 14 after joining thereof. The fuel nozzle assembly 10 includes a mounting flange 16 for mounting on a case 18 of a gas turbine engine using fasteners 17 (one shown) with the fuel injection nozzle 150 positioned in the combustor 22 to discharge or inject fuel into the combustion chamber or zone 23 thereof.

The valve module 12 includes a first valve module support housing 30. The support housing 30 includes portions 30a, 30b welded together at an auxiliary joint J1. The portion 30a includes a thread inlet end 32 adapted to threadably engage a fuel fitting (not shown) to receive pressurized fuel from a fuel manifold (not shown) in known manner. The portion 30b includes a downstream parting end 34, FIG. 6, remote from the inlet end 32 of portion 30a. Parting end 34 is disposed at and forms part of the joint J.

The portion 30a of the valve module support housing 30 includes a fuel inlet passage 36 extending inwardly from the fuel inlet end 32. The fuel inlet passage 36 extends to an interior, longitudinal chamber 38 formed by the portions 30a, 30b when joined at auxiliary joint J1.

Disposed in the chamber 38 are a fuel filter cartridge 40, a check valve cartridge 42, and a fuel metering valve cartridge 44 disposed successively downstream from one another. The fuel filter cartridge 40 includes an annular support collar 46, a filter sleeve 48 made of metal screen or other filtering material and an end cap 50. The filter cartridge 40 is held in position against an annular interior shoulder on the portion 30a in the chamber 38 by coil spring 52 as will be explained.

Fuel flowing through the inlet passage 36 flows through the filter sleeve 48 to the check valve cartridge 42.

The check or poppet valve cartridge 42 is comprised of a tubular valve support 56 having an annular seat 58, a check valve 60 configured in an inverted T-shape and a coil valve spring 62 positioned between the valve support 56 and a retainer 64 located on the upstream end of the valve 60 by clip 66.

The valve support 56 includes a lower o-ring seal 57 and an upper cylindrical, tubular sleeve 70 for receiving the stem 72 of the valve 60. The valve stem 72 terminates downstream in a valve head 76 with an annular resilient, rubber insert 77 to mate and seal with the valve seat 58.

The check valve cartridge 42 is adjusted by the shim 65 between the retainer 64 and the spring 62 so that the check valve 60 will open at a preselected fuel pressure corresponding to a preselected engine start-up fuel pressure as described in aforementioned U.S. Pat. No. 4,491,272. The check valve cartridge 42 will gradually open to a preset limit in response to increased fuel pressure.

The valve support 56 includes annular flanges 80,82 between which the o-ring seal 57 is located. Coil spring 52 engages the upstream flange 80 to hold the check valve cartridge 42 in position in the chamber 38 against the fuel metering valve cartridge 44 that is coaxially aligned downstream of the check valve cartridge 42.

The metering valve cartridge 44 includes a metering valve 45 and tubular valve support 81 having an enlarged downstream end 83 received in a reduced diameter portion of the chamber 38 and sealed against the wall of the chamber by an o-ring seal 84 to prevent fuel from by-passing the metering valve. The valve support 81 includes an upstream sleeve 86 in which the hollow stem 90 of the metering valve 45 is slidably received. The hollow valve stem 90 terminates downstream in a valve head 92 having an annular resilient, rubber insert 94 to mate and seal with the annular valve seat 96 formed on the valve support 81. A coil valve spring 100 is disposed around the sleeve 86 and the valve stem 90 between an inturned lip of outer tubular sleeve 102 and a retainer 104 attached on the valve stem by a clip 106. The outer sleeve 102 is held at its downstream end against the valve support 81 by the spring 100. At its upstream end, the outer sleeve 102 is engaged and biased in the downstream direction by the downstream flange 82 of the valve support 56 of the check valve cartridge 42. The check valve cartridge 42 and the fuel metering valve cartridge 44 are thus held in position in the chamber 38 by the coil spring 52.

Figures 1, 2, 4:
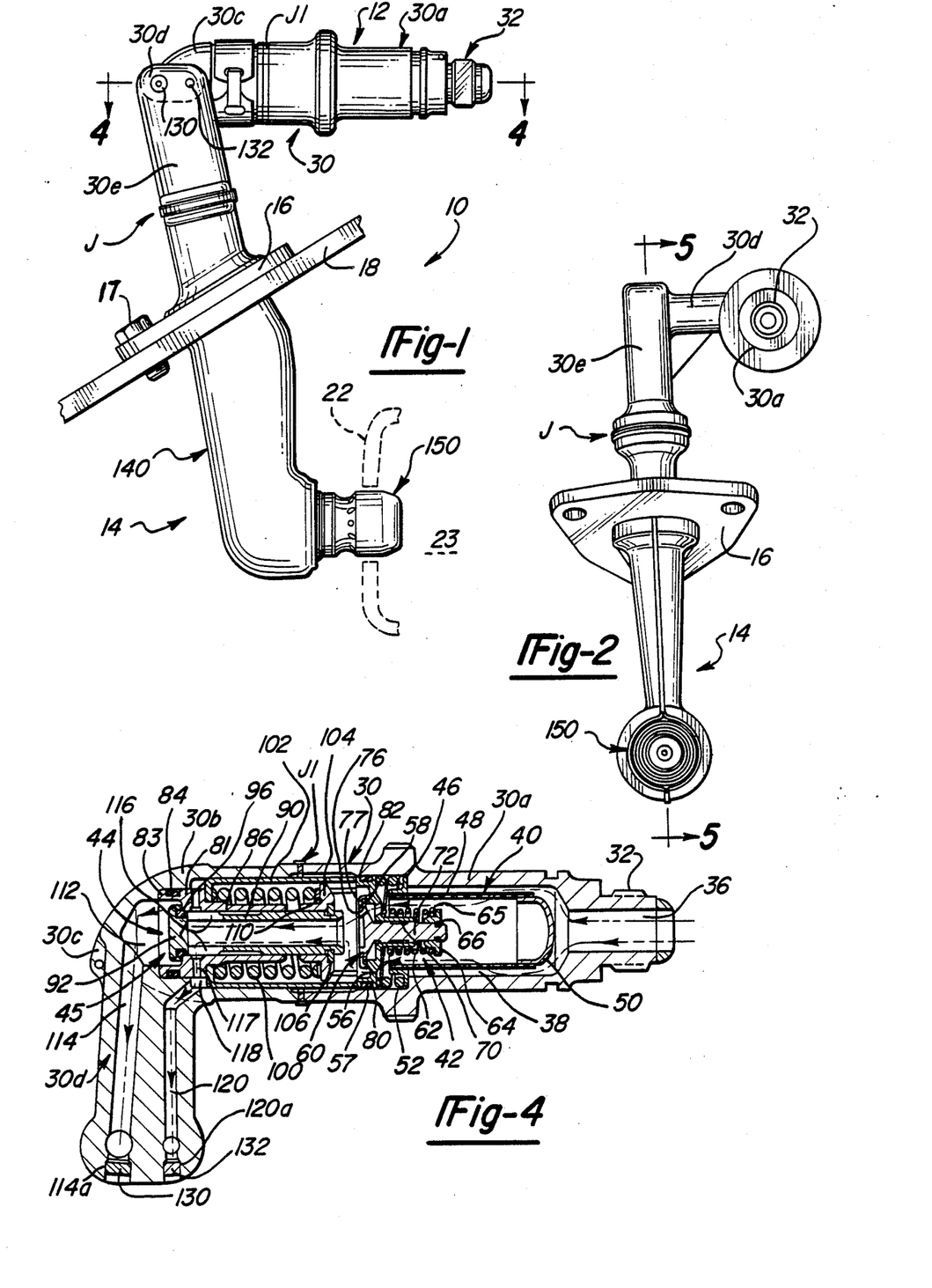
FIG. 1 is a side elevational view of one embodiment of the modular fuel nozzle assembly in accordance with the invention.
FIG. 2 is an elevational view of the fuel nozzle assembly of FIG. 1 taken in a direction looking toward the discharge face of the fuel injection nozzle thereon.
FIG. 4 is a cross-sectional view of the valve module taken along lines 4—4 of FIG. 1.

The metering valve 45 opens to provide a secondary fuel flow stream to a downstream chamber 112 and secondary fuel passage 114 in the housing portion 30b, FIG. 4, to enable operation of the gas turbine engine at higher power conditions. The opening or cracking pressure of the metering valve 45 is adjusted by adjusting preload of the coil spring 100 using an annular shim 110 between the retainer 104 and the spring 100. The metering valve 45 will begin to open when the fuel pressure reaches a preselected fuel pressure higher than that selected to open the check valve 60 as described in U.S. Pat. No. 4,491,272. The metering valve 45 will continue to open to increase fuel flow in prearranged relation with increases in fuel pressure.

A primary fuel stream is provided for low power engine operation by a plurality of circumferentially spaced, longitudinally extending slots 116 in the hollow valve stem 90. In particular, a portion of the fuel flowing through the hollow valve stem 90 flows through the slots 116, through angularly spaced apart passages 117 in valve support 81 and into an annular discharge chamber 118 formed between the housing portion 30b and the valve support 81. The primary fuel stream flows from the chamber 118 to a downstream primary fuel passage 120 which is spaced laterally from the secondary fuel passage 114 in the housing portion 30b as shown. The fuel passages 114,120 extend through the housing portion 30b to the slightly enlarged parting end 34 where they terminate at a shallow recess 124 formed in the parting end 34, FIG. 6.

As shown in FIGS. 1-6, primary and secondary fuel passages 120,114 extend through the end 30c of housing portion 30b, then through the lateral leg 30d thereof and finally through the depending leg 30e thereof to the joint J. Plugs 130,132 are sealingly inserted in the extensions 120a, 114a of the fuel passages where they change direction to pass from the lateral leg 30d through the depending leg 30e. As shown best in FIG. 5, the primary fuel passage 120 includes an enlarged diameter portion 120b in the depending leg 30e of support housing portion 30b for reasons to be explained below.

In the manufacture of the valve module 12, the check valve cartridge 42 and the metering valve cartridge 44 are individually adjusted by flowing a test fluid (simulating fuel flow at appropriate pressure) therethrough to insure proper opening (or cracking) pressure for each valve and fuel flow rate versus fuel pressure characteristics for the metering valve. The preadjusted check valve cartridge 42 and metering valve cartridge 44 are then assembled in the chamber 38 by temporarily joining valve module support housing portions 30a, 30b using an o-ring seal (not shown) instead of the welded joint J1. The temporarily assembled valve module 12 is then flow tested and adjusted using an orifice T (shown schematically in phantom in the exploded view, FIG. 3) temporarily disposed in the secondary fuel passage 114 at the downstream parting end 34 and sealed in the passage 114 by an o-ring seal on the orifice T. The purpose of orifice T is to simulate the pressure drop (or back pressure) to be encountered with a properly calibrated secondary fuel system of a nozzle module 14 when a test fluid at appropriate fluid pressure (simulating fuel flow) is flowed through the temporarily assembled valve module 12. The temporarily assembled valve module 12 is adjusted to provide the desired flow versus fuel pressure characteristics compatible with a typical precalibrated nozzle module 14 to which it will be joined at joint J. If adjustment of the valve module 12 is needed, the support housing portions 30a, 30b are disassembled to enable adjustment of the metering valve 45 (by adjusting preload of spring 100 using shim 110) and/or check valve 60 (by adjusting preload of spring 62 using shim 65).

Following calibration using the orifice T to simulate the pressure drop of the typical nozzle module secondary fuel system and after removal of the orifice T from the passage 114, the check valve cartridge 42 and the metering valve cartridge 44 are reassembled with the fuel filter cartridge 40 in the chamber 38 and the support housing portions 30a, 30b are welded together to form a seal/weld at joint J1.

A plurality of valve modules 12 can be made and precalibrated in the manner described hereinabove wholly independent of the manufacture of the nozzle modules 14. Each valve module 12 so made is calibrated to exhibit fuel flow versus fuel pressure characteristics after opening of the check valve 60 falling within a satisfactory range of performance for the particular nozzle modules 14 to be joined t o the valve module to provide the fuel nozzle assembly 10 having desired fuel flow and fuel pressure characteristics. In particular, the valve module 12 and the nozzle module 14 are each calibrated to exhibit fuel flow versus fuel pressure characteristics within individual closed-in sublimits that together (i.e., when the sublimits of the valve module and nozzle module are aggregated) correspond to the overall closed-in limits of fuel flow versus fuel pressure prescribed for the completed fuel nozzle assembly 10. In effect, some percentage of the overall closed-in limits of fuel flow versus fuel pressure prescribed for the completed fuel nozzle assembly 10 is assigned to the precalibrated valve module 12 and the remaining percentage is assigned to the nozzle module 14.

Importantly, once the valve modules 12 are satisfactorily calibrated to exhibit fuel flow versus fuel pressure characteristics falling within the assigned sublimits for fuel flow versus fuel pressure characteristics, there is no need to further adjust the valve module so long as it is joined to a properly precalibrated cooperative nozzle module 14 falling within its assigned sublimits for fuel flow versus fuel pressure characteristics to form the fuel nozzle assembly 10. The precalibrated valve modules 12 thus are stand-alone modules which require no modification or adjustment thereof or of the nozzle module 14 joined thereto to provide a proper functioning fuel nozzle assembly 10.

The nozzle module 14 includes a second nozzle module support housing 140 which is forged as a single part. The support housing 140 includes an upstream parting end 142 adapted to be joined (e.g., welded) to the parting end 34 of the valve module support housing portion 30b and a downstream end 144 having a fuel nozzle 150 fastened thereon. The mounting flange 16 referred to hereinabove is preferably formed integrally with the nozzle module support housing 140.

Figure 5:
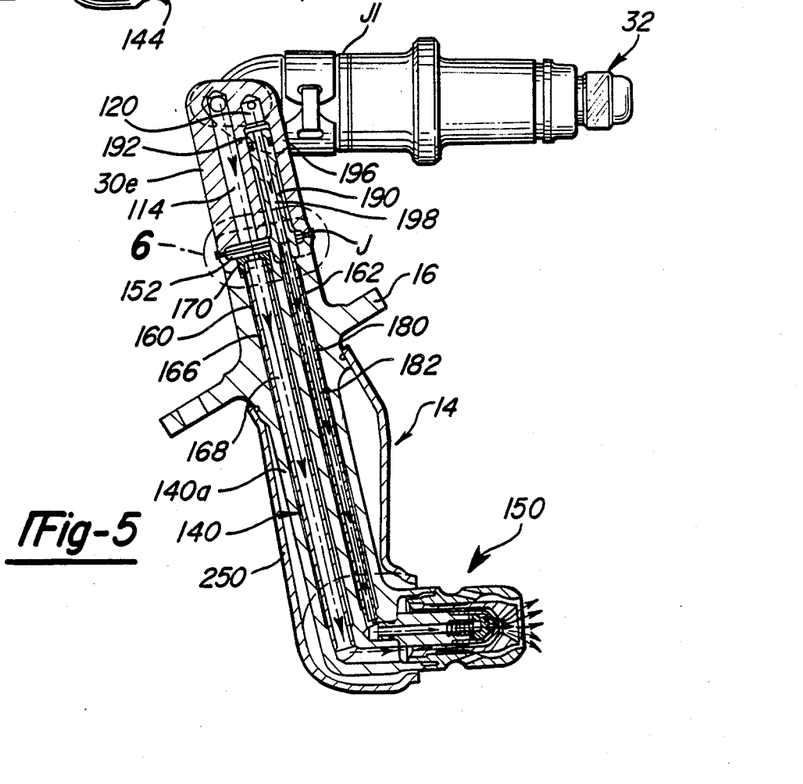
FIG. 5 is a cross-sectional view of the nozzle module taken along line 5—5 of FIG. 2 with the heat shield shown.
Figure 6:
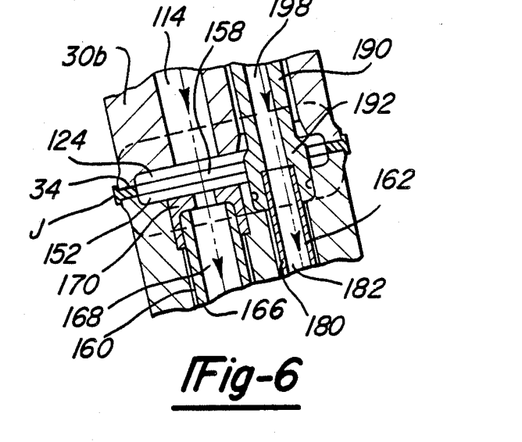
FIG. 6 is an enlarged view of the encircled portion of FIG. 5.

As shown best in FIGS. 5 and 6, a shallow recess 152 is formed in the parting end 142 and is adapted to form with the shallow recess 124 a fuel-receiving chamber 158 at the joint J between the support housings 30,140 when the valve module 12 and nozzle module 14 are joined at joint J. Spaced apart passages 160,162 extend from the recess 152 to the fuel injection nozzle 150. An inner secondary fuel tube 166 is received in the passage 160 to form a secondary fuel passage 168 therein for receiving the secondary fuel stream from the secondary fuel passage 114 via the chamber 158 at the joint J. The fuel tube 166 is spaced from the passage 160 along a majority of its length to provide an insulating air space therearound to thermally insulate the secondary fuel flowing in tube 166. The upstream end of the tube 166 is brazed into a trim plate 170 which is in turn brazed into an enlarged upstream end of the passage 160 adjacent the fuel-receiving chamber 158. The trim plate 170 includes a trim orifice 172 for precalibrating the secondary fuel system of the nozzle module 14 in a manner to be described.

A downstream primary fuel tube 180 is received in the passage 162 to form a primary fuel passage 182 therein. An insulating air space is provided around the tube 180 to thermally insulate the primary fuel flowing through the tube 182 from the primary fuel passage 120.

An upstream primary fuel tube 190 includes an enlarged downstream end 192 brazed in an enlarged upstream end of the passage 162 and an upstream end 192 received in the enlarged portion 120b of the primary fuel passage 120. The upstream end of the tube 190 carries an o-ring seal 196 for sealing against the wall of fuel passage 120b as shown in FIG. 5. It is apparent that the primary fuel tube 190 extends from the nozzle module support housing 140 across the joint J and into the valve module support housing 30 (specifically into the primary fuel passage 120b). As a result, the primary fuel stream flows from the primary fuel passage 120b through the passage 198 in the primary fuel tube 190 into the primary fuel tube 180. The upstream end of the primary fuel tube 180 is received in press fit relation in the primary fuel tube 190.

Figure 3:
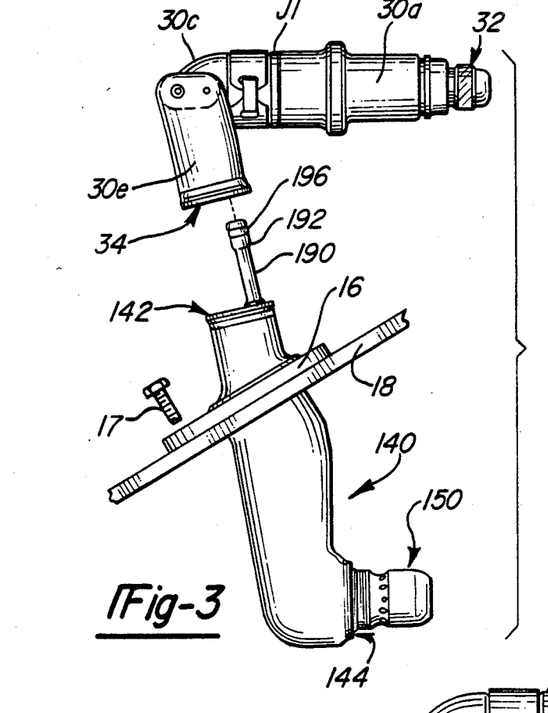
FIG. 3 is an exploded, side elevational view of the fuel nozzle assembly of FIG. 1.

As shown in FIG. 3, the upstream primary fuel tube 190 is disposed exteriorly of the nozzle module 14 when the valve module 12 and nozzle module 14 are separated.

Figure 5A:
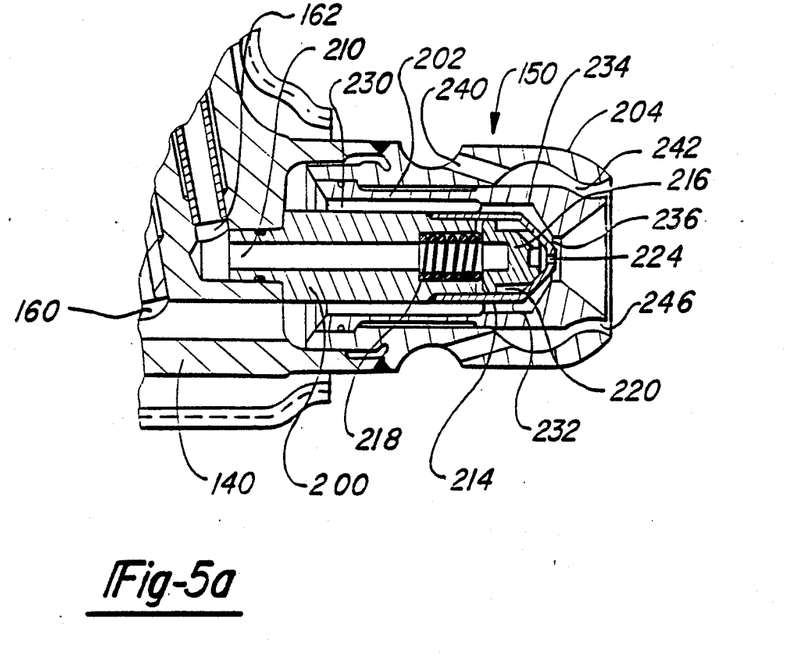
FIG. 5a is an enlarged longitudinal sectional view of the fuel nozzle 150 of FIG. 5.

Referring to FIG. 5 and 5a, the downstream ends of the inner fuel tubes 166,180 terminate in the respective passages 160,162 to provide the secondary fuel stream and primary fuel stream to the fuel injection nozzle 150. The fuel injection nozzle 150 is of conventional construction and includes an inner nozzle body 200, outer nozzle body 202 and outer shroud 204. The inner nozzle body 200 includes an upstream end brazed to the support housing 140 and a longitudinal fuel inlet bore 210 for receiving the primary fuel stream from the passage 162 and extending downstream to an outer tubular insert 214 and inner plug 216 held together by a coil spring 218. The primary fuel stream flows to an outer annular chamber 220 between the outer insert 214 and the plug 216 and then through a discharge slot in the inner plug 216. The primary fuel stream flowing through the discharge slot in the plug 216 is discharged through a central primary fuel discharge orifice 224 formed in the outer insert 214 into the combustor 22 of the gas turbine engine.

The outer nozzle body 202 includes an upstream end brazed to the outer shroud 204. The secondary fuel stream flows from passage 160 into an annular secondary fuel chamber 230 formed between the inner and outer nozzle bodies 200,202. The secondary fuel stream flows past fuel swirl vanes 232 in the chamber 230 through a conical swirl chamber 234 for discharge from the secondary fuel orifice 236 formed in the downstream end of the outer nozzle body 202 into the combustor of the gas turbine engine.

The outer shroud 204 includes an upstream end brazed to the support housing 140 and includes a plurality of circumferentially spaced air inlet holes 240 extending to an annular air swirl chamber 242 formed between the outer shroud 204 and the outer nozzle body 202. Holes 240 capture compressor discharge air for discharge from the annular air discharge orifice 246 formed between the downstream ends of the outer shroud and the outer nozzle body.

A tubular heat shield 250 is shown in FIG. 5 surrounding the portion 140a of the nozzle module support housing 140 between the flange 16 and nozzle 150 that is exposed directly to hot compressor discharge gas flowing between the combustor 22 and the outer duct 18.

In the manufacture of the nozzle module 14, the fuel injection nozzle components (e.g., 200, 202 and 204) are assembled relative to one another and to the support housing 140 and brazed together and joined to the downstream end of the support housing 140. Similarly, trim plate 170, and fuel tubes 166,180 and 190 are brazed in place on the upstream end of the nozzle module support housing 140.

The resulting nozzle module 14 is then calibrated to exhibit fuel flow versus fuel pressure characteristics falling within the closed-in sublimits assigned to the nozzle module 14 and that are compatible with the closed-in sublimits assigned to the valve module 12. Calibration is effected by flowing a test fluid (simulating fuel flow at appropriate pressure) through the nozzle module 14 with the trim plate orifice 172 being used to effect the secondary fuel system pressure drop of the precalibrated valve module 12 to which the nozzle module will be ultimately joined at joint J. If adjustment of the secondary fuel flow system is required, the trim plate orifice 172 is adjusted (in size and/or shape) to provide the desired secondary fuel flow versus fuel pressure characteristics within the assigned sublimits for the nozzle module 14, such that, upon joining to precalibrated cooperative valve module 12 a fuel nozzle assembly 10 having desired fuel flow and fuel pressure characteristics falling within the overall limits prescribed therefor will be formed. Typically, the primary fuel flow does not require adjustment in the valve module or the nozzle module during the module manufacturing stages.

A plurality of nozzle modules 14 can be made and precalibrated in the manner described hereinabove wholly independent of the valve modules 12. Each nozzle module 14 is calibrated to exhibit fuel flow versus fuel pressure characteristics falling within the sublimits assigned thereto and that are compatible with those sublimits of fuel flow versus fuel pressure assigned to the valve module 12 to provide a fuel nozzle assembly 10 having the desired fuel flow versus fuel pressure characteristics falling within the overall limits prescribed when the valve module 12 and the nozzle module 14 are joined at joint J. Importantly, once the nozzle modules 14 are satisfactorily calibrated, there is no need to further adjust the nozzle module so long as it is joined to a matching cooperative valve module 12 precalibrated for joining thereto to form the fuel nozzle assembly 10. The precalibrated nozzle modules 14 thus are stand-alone modules which require no modification or adjustment thereof or of the valve module 12 joined thereto at joint J to provide a properly functioning fuel nozzle assembly As mentioned, any one of the plurality of valve modules 12 made and precalibrated as standalone modules can be joined to any one of the plurality of nozzle modules 14 to provide a properly functioning fuel nozzle assembly 10. Preferably, the means for joining the valve module 12 and nozzle o module 14 is the sealed, welded joint J, FIG. 5. The valve modules 12 and nozzle modules 14 can be made on separate assembly lines wholly independent of one another.

In operation in a gas turbine engine, the inlet end 32 is connected to fuel manifold (not shown) via an inlet fitting (not shown). Fuel flows through the inlet passage 36 through the filter cartridge 40 to the check valve 60 through openings 57 in the valve support 56. The check valve 60 opens when fuel pressure increases to the preselected first minimum level for engine start-up and low power operation. The fuel flows through the hollow valve stem 90 of the metering valve 45 through slots 116 of the metering valve 45 and then through primary fuel passage 120, fuel tube 190, fuel tube 180, and passage 162 into the fuel injection nozzle 150 for discharge into the combustor 22.

When fuel pressure rises to the preselected higher value (i.e., higher than the pressure value for engine start-up) indicating a higher engine power condition, the metering valve 45 begins to open and a portion of the fuel in the hollow valve stem 90 is metered to the secondary fuel passage 114 as a secondary fuel stream. The secondary fuel stream flows from the passage 114 into the fuel-receiving chamber 158 at the joint J and around the primary fuel tube 190. The secondary fuel stream then flows through the trim orifice 170 into inner fuel tube 166 through passage 160 into the fuel injection nozzle 150 for discharge into the combustor 22.

Should the valve module 12 or nozzle module 14 require repair or replacement after service in the gas turbine engine, the fuel nozzle assembly 10 is removed from the engine and the welded joint J is machined away to separate the valve module 12 and the nozzle module 14 for repair or replacement with a fresh module. If a fresh valve module or nozzle module is used, the replacement module is simply taken from a suitable supply of such modules (valve modules or nozzle modules) and welded to the remaining module which is pretested prior to welding to insure that its fuel flow versus fuel pressure characteristics are still within the desired sublimits. After welding the replacement valve or nozzle module to the remaining module to form the fuel nozzle assembly 10, there should be no need to adjust either module. That is, the resulting fuel nozzle assembly 10 will exhibit desired fuel flow versus fuel pressure characteristics falling within the overall limits prescribed therefor. Maintenance of the fuel nozzle assembly 10 is thus greatly facilitated. Typically, in service, the nozzle module (particularly the fuel injection nozzle 150 therein) requires repair or replacement more often than the valve module. In this situation, the nozzle module 14 can be separated from the valve module 12 and a fresh nozzle module welded to the valve module to provide a properly functioning fuel nozzle assembly 10. The used nozzle module separated from the valve module can then be repaired and returned to service by joining to another valve module.

Figure 7:
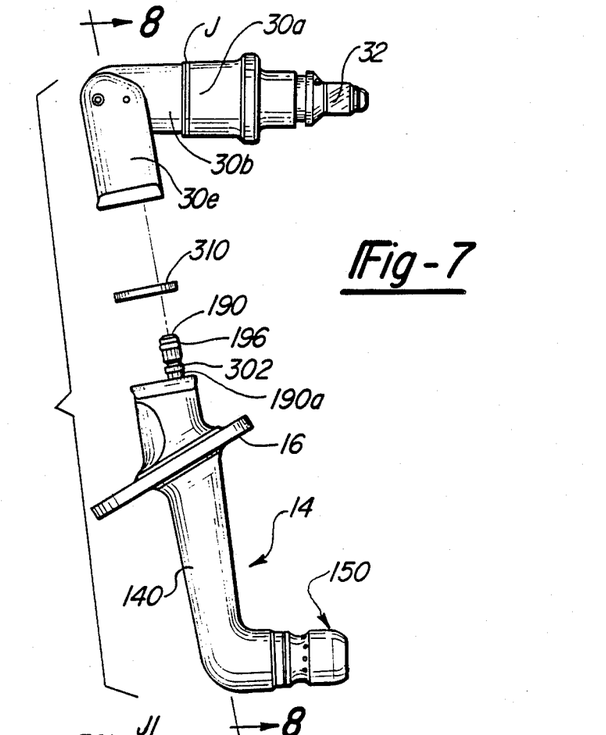
FIG. 7 is an exploded side elevational view of another embodiment of the fuel nozzle assembly of the invention with the heat shield removed from the nozzle module.
Figure 8:
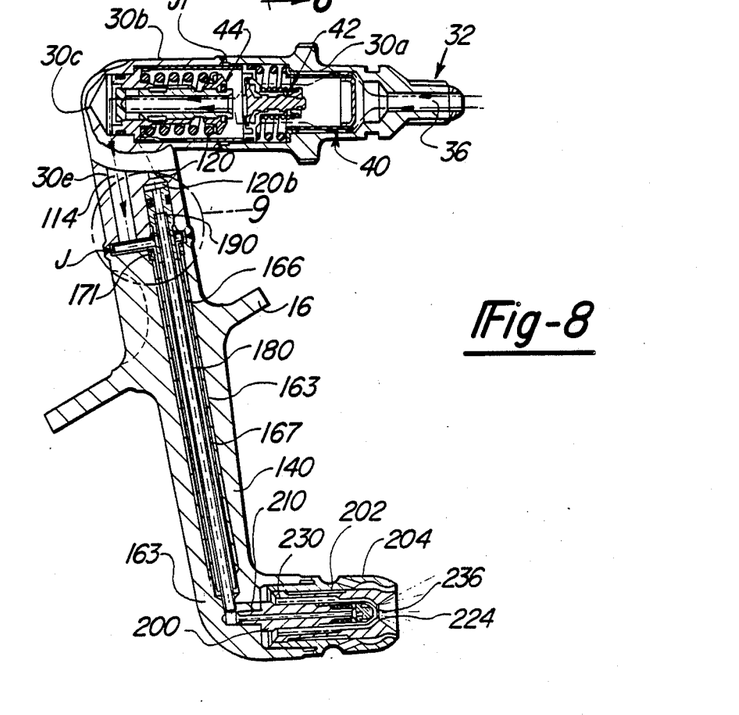
FIG. 8 is a cross-sectional view of the fuel nozzle assembly taken along lines 8—8 of FIG. 7.
Figure 9:
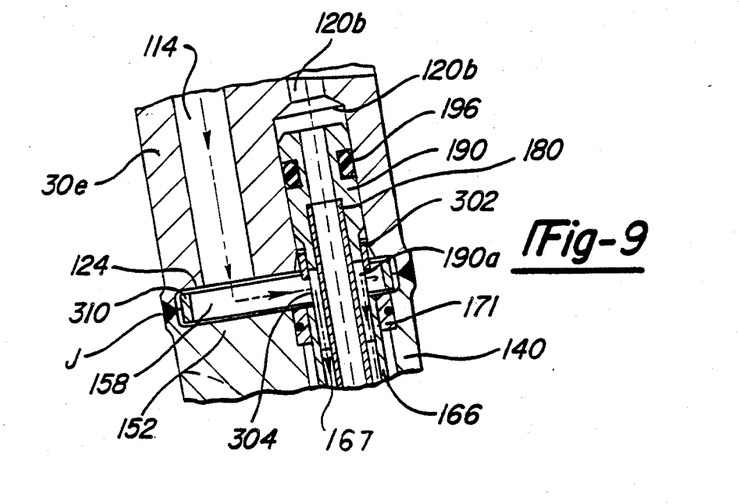
FIG. 9 is an enlarged view of the encircled portion of FIG. 8.

FIGS. 7-9 illustrate another embodiment of the fuel nozzle assembly of the invention wherein like features of FIGS. 1-6 are represented by like reference numerals. The embodiment of FIGS. 7-9 differs from that of FIGS. 1-6 in having a single passage 163 in the nozzle module 14 instead of laterally spaced apart passages 160, 162. Received in the single passage 163 are nested fuel tubes 166, 180. The upstream end of the inner primary fuel tube 180 is press fit into the outer primary fuel tube 190 extending across the joint J into the primary fuel passage 120b in the valve module 12.

The outer nested secondary fuel tube 166 forms an annular secondary fuel passage 167 between the nested tubes 166, 180. The upstream end of the tube 166 is press fit into an insert 171 that is brazed to the nozzle module support housing 140. The upstream end of the tube 166 receives the downstream slotted end of the primary fuel tube 190.

The embodiment of FIGS. 7-9 also differs from that of FIGS. 1-6 in having an orifice sleeve 302 mounted on the downstream slotted end of the primary fuel tube 190 within the fuel-receiving chamber 158 for providing adjustable trim orifices 304 therein upstream of secondary fuel passage 167. The sleeve 302 is slidable relative to slots 190a in the primary fuel tube 190. The trim orifices 304 are adjusted as needed by sliding sleeve 302 on the reduced diameter portion of the fuel tube 190, FIG. 9. In this way, the nozzle module 12 can be precalibrated in the same general manner as described above for FIGS. 1-6 but by adjusting the position of sleeve 302 relative to slots 190a in the primary fuel tube 190 instead of the shape/size of trim orifice 172.

FIGS. 7-9 also illustrate an annular so-called weld ring 310 disposed in the fuel-receiving chamber 158. The weld ring 310 is provided to prevent inward blasting of weld particles into the chamber 158 when the valve and nozzle modules 12,14 are welded together at joint J.

As best seen in FIG. 9, the secondary fuel stream flows from the secondary fuel passage 114 in the valve module support housing 30 into the fuel-receiving chamber 158 through the trim orifices 304 and into the annular secondary fuel passage 167 between the nested tubes 166,180. It then flows into the fuel injection nozzle 150 for discharge into the combustor as explaned hereinabove. The primary fuel flow is the same as explained hereinabove for FIGS.

Figure 10:
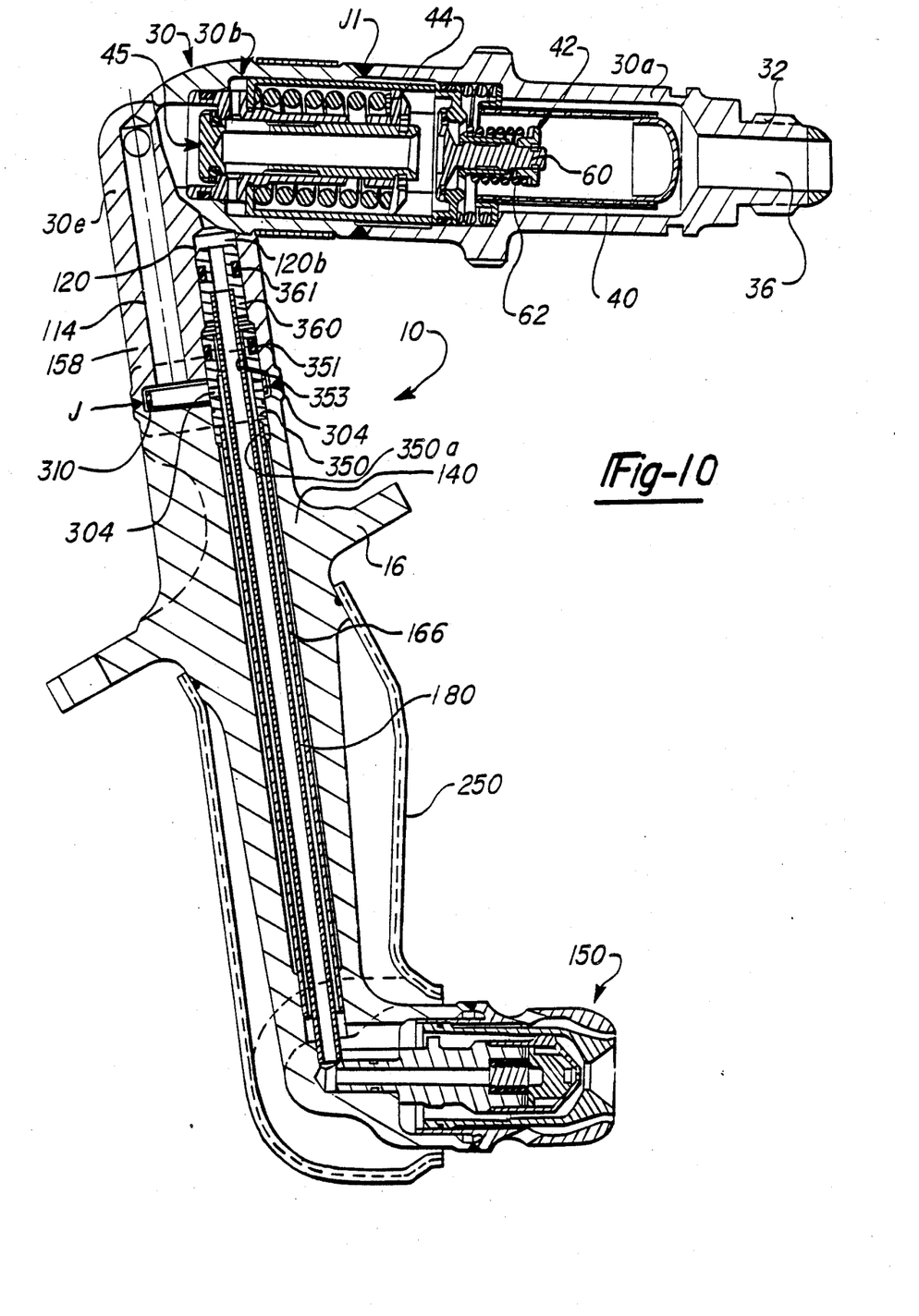
FIG. 10 is a view similar to FIG. 8 of still another embodiment of the fuel nozzle assembly of the invention with the valve module and the nozzle module shown in section with the heat shield thereon.
Figure 11:
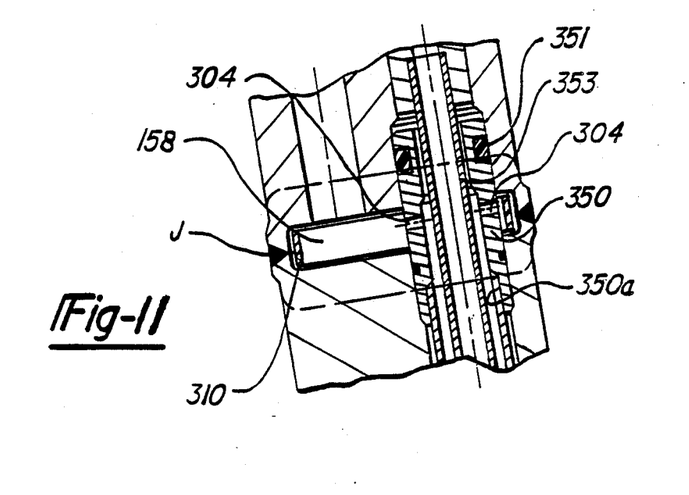
FIG. 11 is an enlarged view of the joint J of FIG. 10 with the trimming orifices shown 90° out of position.

FIGS. 10–11 illustrate still another embodiment of the invention similar to that shown in FIGS. 7–9 yet differing therefrom in the manner in which the trim orifices 304 are formed. In particular, the trim orifices 304 are formed in a tubular sleeve 350 having a downstream end brazed to the nozzle module support housing 140 and having an enlarged passage 350a receiving in press fit the upstream end of the outer nested secondary fuel tube 166.

The upstream end of the sleeve 350 extends across the joint J into an enlarged diameter portion of the primary fuel passage 120b and is sealingly received therein by virtue of o-ring seal 351 carried on the upstream end thereof. The upstream end of the sleeve 350 includes a passage 353 through which the primary fuel tube 180 extends into the primary fuel passage 120b in the valve module support housing 30. The upstream end of primary fuel tube 180 is press fit into an insert 360 sealingly received in the passage 120b upstream of the sleeve 350 by virtue of an o-ring seal 361 carried thereon. The trim orifices 304 are adjusted by changing their shape/size. Otherwise, the construction and calibration of the fuel nozzle assembly 10 of FIGS. 10–11 is the same as described hereinabove for the assembly of FIGS. 1–9 and like reference numerals are used to designate like features.

In FIGS. 7–11, the valve modules 12 are substantially identical to the valve module 12 of FIGS. 1–6.

Figure 12:
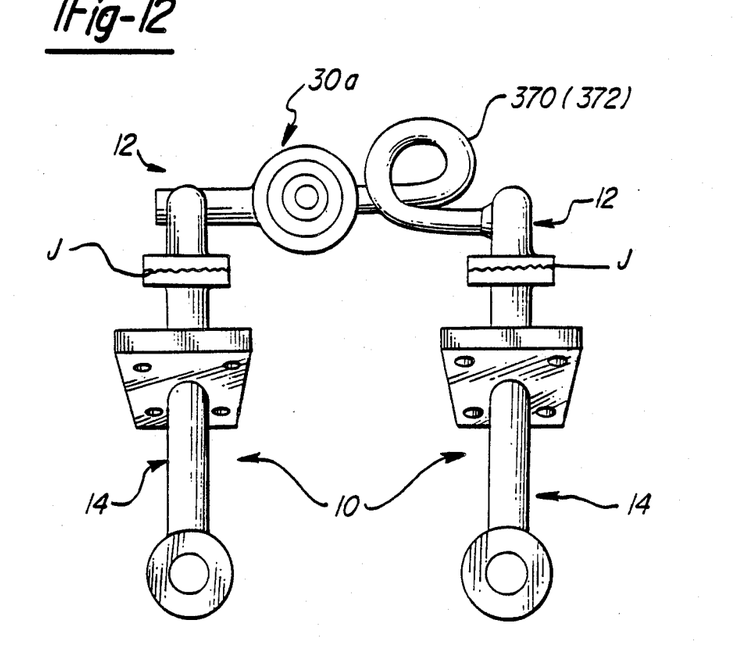
FIG. 12 is an elevational view of another embodiment of the invention employing dual fuel nozzle assemblies sharing a common check valve and metering valve.

FIG. 12 illustrates still another embodiment of the invention wherein a pair of fuel nozzle assemblies 10 share a common check valve cartridge (not shown) and metering valve cartridge (not shown) disposed in valve module support housing portion 30a formed integral with one (the left hand) of the fuel nozzle assemblies. Flexible primary and secondary fuel flow tubes 370,372 extend left hand valve module 12 and connect to extensions (not shown but corresponding to extensions 120a, 114a of the primary and secondary fuel passages 120,114 formed in the depending leg 30e of the valve module 12, e.g., similiar to those shown in FIG. 4) of the other (the right hand) fuel nozzle assembly 10. The tubes 370,372 are attached to suitable ports (not shown) on valve housing portion 30a to receive the primary and secondary fuel steams therefrom.

This embodiment of the invention offers significant weight reduction benefits by eliminating one set of the check valve and the metering valve and also one of the fuel inlet connections to the fuel supply manifold. The benefits of using the precalibrated, stand-alone valve modules 12 and nozzle modules 14 are retained, however. A low cost dual fuel nozzle assembly is provided by this embodiment.

Although the joint J between the valve module 12 and nozzle module 14 has been illustrated hereinabove as a welded joint, those skilled in the art will appreciate that other means may be employed to form a joint or interface between the modules. For example, such joint forming means may include a bolted joint with o-ring sealing between the housings 30,140.

Moreover, although the invention has been described with reference to dual orifice fuel nozzle assemblies, those skilled in the art will appreciate that it is not limited thereto and that the invention is applicable to airblast fuel nozzle assemblies and hybrid fuel nozzle assemblies.

While the fuel nozzle assembly of the invention and method of making same have been described by a detailed description of certain specific and preferred embodiments, it is understood that various modifications and changes can be made in them within the scope of the appended claims which are intended to include equivalents of such embodiments.

I claim:

1. A fuel nozzle assembly having prescribed fuel flow versus fuel pressure characteristics, comprising:
    (a) a valve module having a first support housing with a fuel inlet, a fuel metering valve mounted interiorly of the first housing for providing a valved fuel flow and a first fuel passage in the first housing for receiving the valved fuel flow,
    (b) a nozzle module having a second support housing, a second fuel passage in the second housing for receiving the valved fuel flow from the first fuel passage, and a fuel injection nozzle on the second housing for discharging the valved fuel flow into a combustion chamber,
    (c) means for joining said first housing and said second housing at a joint in such a manner as to permit separation of the valve module and the nozzle module from one another, and
    (d) said valve module and nozzle module being separately precalibrated to provide, when joined, said prescribed fuel flow rate versus fuel pressure characteristics without the need for adjustment thereof after joining.

2. A fuel nozzle assembly having prescribed fuel flow versus fuel pressure characteristics, comprising:
    (a) a valve module having a first support housing with a fuel inlet, a fuel metering valve mounted interiorly of the first housing for providing a valved fuel flow and a first fuel passage in the first housing for receiving the valved fuel flow,
    (b) a nozzle module having a second support housing, a second fuel passage in the second housing for receiving the valved fuel flow from the first fuel passage, and a fuel injection nozzle on the second housing for discharging the valved fuel flow into a combustion chamber,
    (c) means for joining said first housing and second housing together at a joint with said first fuel passage and said second fuel passage in fuel flow communication, said joint being located between the fuel metering valve and the fuel injection nozzle to permit separation of the valve module and nozzle module from one another, and
    (d) said valve module and nozzle module being separately precalibrated to provide, when joined, said prescribed fuel flow rate versus fuel pressure characteristics without the need for adjustment thereof after joining.

3. The assembly of claim 2 further including a trimming orifice adjacent the joint to precalibrate the fuel flow rate versus fuel pressure characteristics of the nozzle module.

4. The assembly of claim 2 wherein the valve module includes a fuel metering valve cartridge including said fuel metering valve and a valve support disposed on the first housing.

5. The assembly of claim 2 wherein the second outer housing includes a mounting flange disposed upstream of the fuel injection nozzle for mounting the assembly on an engine case, said joint being located between the fuel metering valve and the mounting flange.

6. A fuel nozzle assembly having prescribed primary fuel and secondary fuel flow versus fuel pressure characteristics, comprising:
  (a) a valve module having a first support housing with a fuel inlet, means for providing a primary fuel flow and a secondary fuel flow, said means including a fuel metering valve mounted interiorly of the first housing for controlling the secondary fuel flow, a first primary fuel passage in the first housing for receiving the primary fuel flow and a first secondary fuel passage in the first housing for receiving the secondary fuel flow,
  (b) a nozzle module having a second support housing, a second primary fuel passage in the second housing for receiving primary fuel flow from the first primary fuel passage, a second secondary fuel passage in the second housing for receiving secondary fuel flow from the first secondary fuel passage, and a fuel injection nozzle on the second housing for discharging the primary fuel flow and secondary fuel flow into a combustion chamber,
  (c) said first housing and second housing being joined together at a joint with the first and second primary fuel passages and the first and second secondary fuel passages in fuel flow communication, said joint being located between the fuel metering valve and the fuel injection nozzle to permit separation of the valve module and the nozzle module from one another,
  (d) a fuel tube extending across the joint between the valve module and nozzle module for connecting the first and second primary fuel passages in fuel flow relation, and
  (e) said valve module and nozzle module being separately precalibrated to provide, when joined, said prescribed primary fuel and secondary fuel flow rate versus fuel pressure characteristics without the need for adjustment thereof after joining.

7. The assembly of claim 6 wherein said fuel tube is attached at a downstream end to the second housing and extends from the second primary fuel passage across the joint into the first housing in fuel flow communication with the first primary fuel passage.

8. The assembly of claim 7 wherein the fuel tube includes a seal member on an upstream end thereof received in the first outer housing.

9. The assembly of claim 8 wherein the fuel tube is received in an enlarged passage in the first outer housing.

10. The assembly of claim 7 wherein a chamber is formed around the fuel tube at the joint between the first and second secondary fuel passages to receive secondary fuel flowing therebetween.

11. The assembly of claim 10 wherein the second primary fuel passage and second secondary fuel passage are nested one inside the other downstream of said chamber in the second housing.

12. The assembly of claim 10 wherein a trimming orifice for the secondary fuel flow is disposed in said chamber.

13. The assembly of claim 10 wherein a trimming orifice for the secondary fuel flow is disposed adjacent the joint between said chamber and said second secondary fuel passage.

14. The assembly of claim 10 wherein an annular weld ring is disposed in the chamber.

15. The assembly of claim 6 including a secondary fuel trimming orifice in the nozzle module adjacent the joint for precalibrating the fuel flow rate versus fuel pressure characteristics of the nozzle module.

16. The assembly of claim 6 wherein the valve module includes a fuel metering valve cartridge comprising said fuel metering valve and a valve support disposed on the first housing.

17. A method of making a fuel nozzle assembly having prescribed fuel flow versus fuel pressure characteristics, comprising:
  (a) forming a valve module having a first support housing with a fuel inlet, a fuel metering valve mounted interiorly of the first housing for providing a valved fuel flow and a first fuel passage in the first housing for receiving the valved fuel flow,
  (b) forming a nozzle module having a second support housing, a second fuel passage in the second housing for receiving the valved fuel flow from the first fuel passage, and a fuel injection nozzle on the second housing for discharging the valved fuel flow into a combustion zone,
  (c) precalibrating the valve module to provide fuel flow versus fuel pressure characteristics compatible with fuel flow versus fuel pressure characteristics of said nozzle module,
  (d) precalibrating the nozzle module to provide fuel flow versus fuel pressure characteristics compatible with the fuel flow versus fuel pressure characteristics of said valve module,
  (e) the precalibrated fuel flow versus fuel pressure characteristics of said valve module and said nozzle module being compatible such that said fuel nozzle assembly exhibits said prescribed fuel flow versus fuel pressure characteristics when the valve module and the nozzle module are joined, and
  (f) joining the valve module and the nozzle module to form said fuel nozzle assembly, including joining the first housing and the second housing at a joint between the fuel control valve and the fuel injection nozzle with the first and second fuel passages in fuel flow communication.

18. The method of claim 17 including positioning a trim orifice in the second fuel passage of the nozzle module adjacent the joint prior to precalibrating the nozzle module.

19. The method of claim 17 further including disassembling the joint between the first and second housings, replacing one of said valve module and nozzle module with a precalibrated replacement module and joining a support housing of the replacement module to the support housing of the unreplaced module at said joint.

20. The method of claim 17 further including disassembling the joint between the first and second housings, repairing one of said valve module and nozzle module to form a precalibrated repaired module, and joining the support housing of the repaired module to the support housing of the unrepaired module at said joint.

21. The method of claim 17 including forming a plurality of precalibrated valve modules and a plurality of precalibrated nozzle modules and joining any one of the valve modules to any one of nozzle modules to form the fuel nozzle assembly without the need for further adjustment of said modules.

22. The method of claim 17 including positioning a trim orifice in the first fuel passage of the valve module adjacent the joint prior to precalibrating the valve module and removing the trim orifice after precalibrating the valve module and prior to joining the valve module and the nozzle module.

23. A method of making a fuel nozzle assembly having fuel flow versus fuel pressure characteristics falling within prescribed limits, comprising:
 (a) forming a valve module having a first support housing with a fuel inlet, a fuel metering valve mounted interiorly of the first housing for providing a valved fuel flow and a first fuel passage in the first housing for receiving the valved fuel flow,
 (b) forming a nozzle module having a second support housing, a second fuel passage in the second housing for receiving the valved fuel flow from the first fuel passage, and a fuel injection nozzle on the second housing for discharging the valved fuel flow into a combustion zone,
 (c) precalibrating the valve module and precalibrating the nozzle module to exhibit fuel flow versus fuel pressure characteristics falling within respective first sublimits and second sublimits of said prescribed limits such that said first and second sublimits, when aggregated upon joining of the valve module and nozzle module, provide fuel flow versus fuel pressure characteristics for said fuel nozzle assembly corresponding to said prescribed limits, and
 (d) joining the valve module and nozzle module to form said fuel nozzle assembly, including joining the first housing and second housing at a joint between the fuel control valve and the fuel injection nozzle with the first and second fuel passages in fuel flow communication.

* * * * *

UNITED STATES PATENT AND TRADEMARK OFFICE
CERTIFICATE OF CORRECTION

PATENT NO. : 4,938,418
DATED : July 3, 1990
INVENTOR(S) : Robert M. Halvorsen

It is certified that error appears in the above-indentified patent and that said Letters Patent is hereby corrected as shown below:

Column 1, line 32, after "assembly" insert --.--.

Column 1, line 58, delete "standalone" and insert --stand-alone-- therefor.

Column 2, line 40, after "required" insert --.-- .

Column 2, line 55, after "engine" insert --.-- .

Column 3, line 16, after "joining"

Column 3, line 21, after "case" insert --.-- .

Column 3, line 29, after "housing" insert --.-- .

Column 6, line 62, delete "t o" and insert --to-- therefor.

Column 7, line 38, delete "t he" and insert --the-- therefor.

Column 9, line 37, after "assembly" insert --10--.

Column 9, line 39, delete "standalone" and insert --stand-alone-- therefor.

Column 9, line 43, after "nozzle" delete "o".

Column 11, line 11, after "Figs." insert --1-6--.

UNITED STATES PATENT AND TRADEMARK OFFICE
CERTIFICATE OF CORRECTION

PATENT NO. : 4,938,418
DATED : July 3, 1990
INVENTOR(S) : Robert M. Halvorsen

It is certified that error appears in the above-indentified patent and that said Letters Patent is hereby corrected as shown below:

Column 11, line 47, after "extend" insert --from the--.

Signed and Sealed this

Fifteenth Day of June, 1993

Attest:

MICHAEL K. KIRK

*Attesting Officer*   Acting Commissioner of Patents and Trademarks